United States Patent

[11] 3,578,172

[72] Inventors Maria Gavrilovna Sirotkina
Prospekt Mira, 180, Kv. 193, Moscow;
Jury Gotlibovich Kozlov, Khoroshevskoe
shosse, 11, kv. 47; Alevtina Vasilievna
Alexeeva, Botanichesky proezd, 3a, kv.16;
Ljudmila Alexeevna Afanasieva,
Anadyrsky proezd, 1, kv.78; Galina
Nikolaevna Benyash, Khutorskaya ulitsa, 7,
kv.28; Efim Bentsionovich Gorbovitsky, 4
Vishnyakovsky proezd, 5, korpu, 4, kv.27;
Ljudmila Alexeevna Levitskaya,
Kotelnichedkaya naberezhnaya, 25 kv.5;
Galina Konstantinovna Lisitsina, Ulitsa
Moldtsova, 9, kv.7; Anatoly Stepanovich
Tkachenko, ulitsa Iva Tolstogo, 5, kv.15,
Pushkino, Moskovskaya obl.; Adolf
Iserovich Khaitlin, Bolshevistsky pereulok,
13/3, kv.13, U.S.S.R.
[21] Appl. No. 735,322
[22] Filed June 7, 1968
[45] Patented May 11, 1971
[32] Priority Sept. 25, 1967
[33] U.S.S.R.
[31] 1,186,150

[54] APPARATUS FOR REMOVING TOXIC SUBSTANCES AND EXCESS WATER FROM THE BLOOD
4 Claims, 5 Drawing Figs.
[52] U.S. Cl..................................................... 210/321,
210/456
[51] Int. Cl...................................................... B01d 31/00
[50] Field of Search............................................ 210/22, 23,
321, 456, 137

[56] References Cited
UNITED STATES PATENTS
| | | | |
|---|---|---|---|
| 3,074,559 | 1/1963 | Savino.......................... | 210/321 |
| 3,332,746 | 7/1967 | Claff et al. ................... | 210/321X |
| 3,396,849 | 8/1968 | Lande et al. .................. | 210/321 |
| 3,411,630 | 11/1968 | Alwall et al................... | 210/321 |
| 3,459,310 | 8/1969 | Edwards....................... | 210/321 |

OTHER REFERENCES
Hunt et al., " Laboratory and Clinical Evaluation UFA Small Countercurrent Dialyzer, the Miniklung," from Vol. XIV, TRANS. AMER. SOC. ARTIF. IHT. ORGANS, Held April 21 and 22, 1968, pp. 109— 113 relied on.

Primary Examiner—Frank A. Spear, Jr.
Attorney—Waters, Roditi, Schwartz & Nissen

ABSTRACT: An apparatus for removing toxic substances and excess water from blood being intended for treating chronic cases of renal insufficiency. In contrast to the devices known in the art, the present apparatus provides an effective normalization of aqueous-electrolytic balance and elimination of toxic products of metabolism when it is not necessary to introduce the donor blood for the initial filling of the blood conveying system. In said apparatus, the resistance of the blood conveying system of the dialyzer is reduced. The elements of the blood conveying system are sterilized by oil boiling or treating in an autoclave.

Patented May 11, 1971 3,578,172

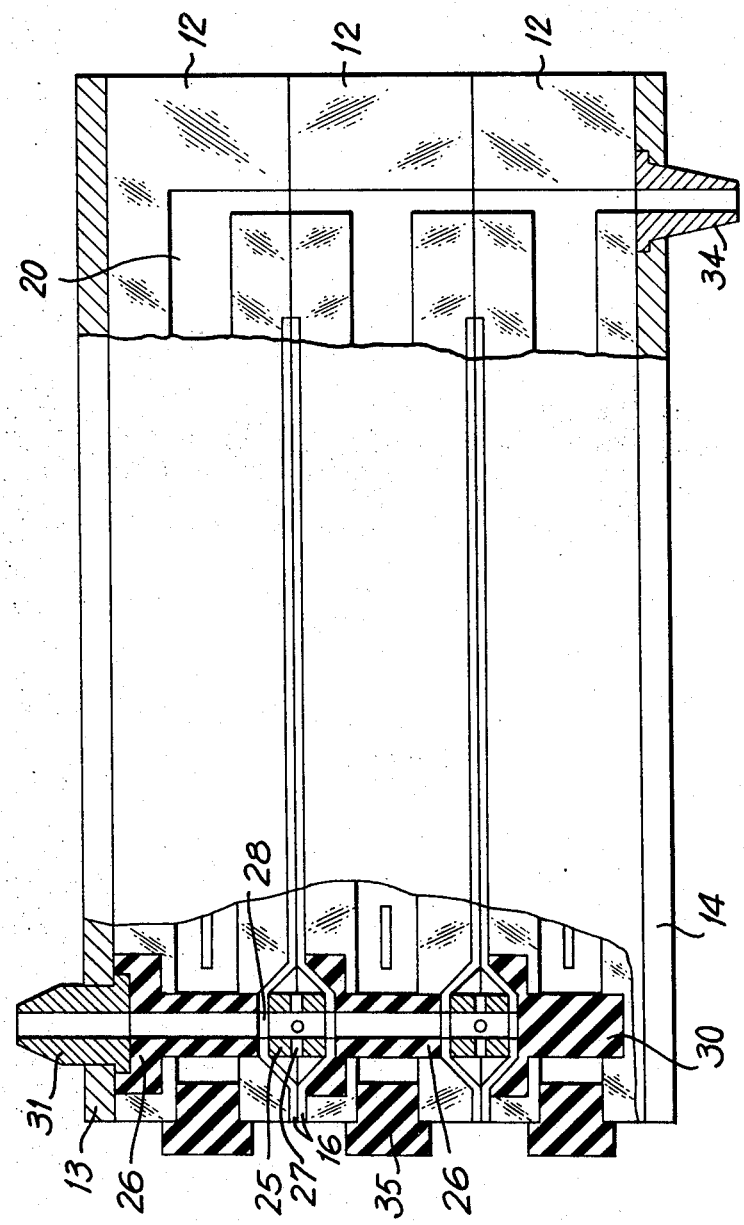

APPARATUS FOR REMOVING TOXIC SUBSTANCES AND EXCESS WATER FROM THE BLOOD

This invention relates to an apparatus for eliminating toxic substances and excess water from blood. The apparatus is employed chiefly in urology for normalizing the internal medium of the organs of patients afflicted with renal insufficiency. The apparatus, according to the invention, is designed principally for the treatment of chronic cases of renal insufficiency.

It is known to employ apparatus known as an "Artificial Kidney" for removing toxic substances and excess water from blood, notably in cases of chronic renal insufficiency.

These prior art apparatus comprise a plate dialyzer; a movable stand for the dialyzer; a device for running the dialyzing solution, constructed in the form of a container equipped with pumps, electric heaters for warming the dialyzing solution, and a temperature regulator; a control panel; and a piping system for the blood and the dialyzing solution.

The prior art apparatus operates on the principle of equilibrium exchange, through a flat semipermeable membrane, between the blood plasma and a dialyzing solution of standard electrolyte composition. The exchange takes place in a plate dialyzer into which blood from the patient's body and the dialyzing solution are fed simultaneously.

The blood runs along the capillary canals of the dialyzer in cavities (effective layers) between the semipermeable membranes, while the dialyzing solution flows between the membranes and the plates.

However, in the known apparatus an adequate overall dialyzing surface of the semipermeable membranes of the dialyzer is attained only when the number of effective layers is large, thus requiring an increased number of commutations between these layers, and causing difficulties in rendering the device airtight, in assembling and disassembling it, and in cleaning and sterilizing it.

A reduction in the number of effective layers, provided the overall dialyzing surface of the semipermeable membranes remains constant, may be attained by increasing the area of each plate of the dialyzer and also by a more efficient utilization of this area for hemodialysis.

It must, however, be pointed out that an increase in the area of the plates by making said plates longer or wider is impracticable.

Where use is made of wider plates, the length of the inlet and outlet manifolds connecting the capillary canals increases and results in nonuniform distribution of the blood in the capillaries and also necessitates a greater priming volume of the blood-conveying system.

If the plates are made longer, the length of the capillary canals also increases, with a corresponding increase in their resistance to blood flow.

Hence, if the known apparatus is directly connected (without a pump) to the patient, the velocity of the blood flow will diminish the efficiency of normalization of the internal medium of the organism, according to the decrease in the velocity. The employment of a pump for driving the blood through the known apparatus requires continuous adjustment of blood flow rate in conformity with the patient's condition, thereby complicating the control of the apparatus during hemodialysis. Moreover, the use of a pump increases the priming volume of the blood-conveying system of the apparatus and involves elaborate preparations for the commencement of operation of the apparatus.

The resistance to blood flow may be reduced by increasing the thickness of the effective layer but in this case the priming volume of the blood-conveying system, also increases and necessitates the employment of either donor blood or blood substitutes for priming the apparatus, so that hemodialysis operations become complicated and expensive.

Moreover, in the known apparatus, part of the area of each plate is not utilized for hemodialysis owing to the fact that the manifolds of the blood-conveying system communicate through openings in the plates; said openings being spatially separated from the manifolds of the system which distribute the dialyzing solution.

At the same time, direct contact between the blood and the plates of the dialyzer makes sterilization of said plates mandatory, and imposes additional requirements as to the quality and sterility of the material of the contact surfaces.

It is an object of the present invention to provide an apparatus for the removal of toxic substances and excess water from blood, in which the manifolds of the blood-conveying system and the connections therebetween are disposed so as to minimize the blood path between the manifolds and the manifolds of the dialyzing solution distributing system and the elements interconnecting said manifolds coincide spatially.

In accordance with this and other objects, the present invention provides an apparatus for removing toxic substances and excess water from blood, which apparatus comprises a plate dialyzer with a network of capillary canals and grooves united by inlet and outlet manifolds that constitute, in conjunction with the semipermeable membranes clamped between the plates, a blood-conveying system and a dialyzing solution distributing system, and means for driving the dialyzing solution, wherein, according to the invention, the manifolds of the blood-conveying system are branched and the branches of the inlet manifold alternate with the branches of the outlet manifold.

It is expedient to taper the inlet manifolds and expand the outlet manifolds of the blood-conveying system in the direction of blood flow.

Moreover, in the apparatus which contains, in addition to the aforesaid elements, distributing sleeves for directing the blood between the semipermeable membranes, it is advantageous to provide communications between appropriate inlet and outlet manifolds of the blood-conveying systems disposed on opposite sides of the dialyzer plates through removable adapters mounted in through holes provided in the plates and hermetically clamped between the semipermeable membranes.

It is expedient to make the adapters of an elastic material, such as rubber.

Other objects and advantages of the present invention will be apparent from the description of exemplary embodiments, and with reference to the accompanying drawings, wherein:

FIG. 4 is an enlarged side view of the dialyzer partly in section; and

Figure 1:
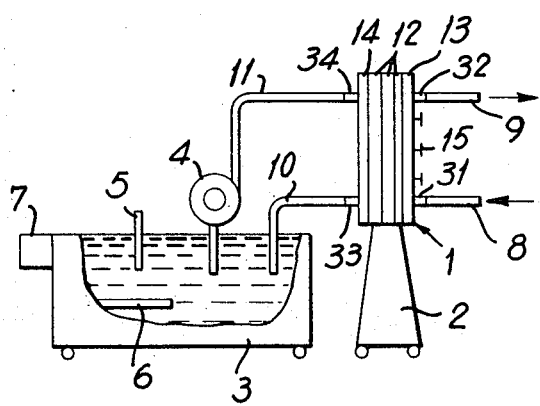
FIG. 1 is a schematic diagram of the apparatus for removing toxic substances and excess water from blood.

The apparatus for the removal of toxic substances and excess water from blood comprises a dialyzer 1 (FIG. 1) on a movable stand 2, a container 3 with a pump 4 for driving the dialyzing solution, a temperature controller 5, a heater 6, a control panel 7, lines 8 and 9 for the blood, and lines 10 and 11 for the dialyzing solution.

The dialyzer 1 consists of plates 12, an upper lid 13 and lower lid 14 secured by bolt 15. Two semipermeable membranes 16 (FIG. 2) are clamped between plates 12.

Figure 3:
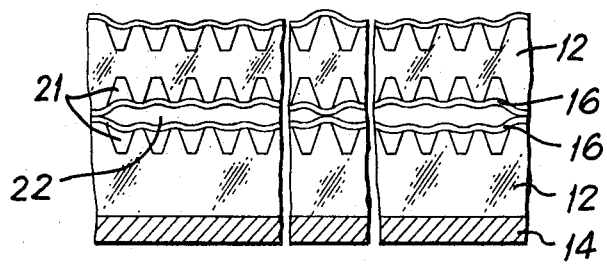
FIG. 3 is an enlarged view of the dialyzer in section along the line III–III of FIG. 2.

Each plate 12 is furnished with inlet manifold 17 and 18 and outlet manifolds 19 and 20 and lengthwise grooves 21 (FIG. 3).

The ridges of said grooves 21 are arranged below the surfaces of plates 12 in such a manner that capillary canals 22 are formed between two semipermeable membranes 16.

The capillary canals 22 are provided for the passage of blood through the apparatus, and in conjunction with the inlet manifold 17 (FIG. 2) and outlet manifold 19 constitute the blood-conveying system.

The grooves 21 (FIG. 3), in conjunction with the inlet manifolds 18 (FIG. 2) and outlet manifold 20 constitute the dialyzing solution distributing system.

The inlet manifold 17 and outlet manifold 19 of the blood-conveying system are provided with branches 23 and 24, respectively.

The inlet manifolds 17 taper in the direction of blood flow while the outlet manifolds 19 are expanded in said direction.

The inlet manifold 17 and outlet 19 communicate through distributing sleeves 25 (FIGS. 2,4) and adapters 26, respectively.

The distributing sleeves 25 are mounted between the semipermeable membranes 16, provision being made in the sleeve walls for openings 27.

The semipermeable membranes 16 are also perforated by holes 28 and 29.

In the lower plate of the dialyzer, provision is made for plugs 30.

The upper lid 13 carries connecting branches 31 and 32 (FIG. 1) to which the blood-conveying lines 8 and 9 are joined.

The lower lid 14 is furnished with connecting branches 33 and 34 to which dialyzing solution lines 10 and 11 are joined.

In the inlet manifold 18 (FIG. 2) and outlet manifold 20 of the dialyzing solution (distributing system) the outlet ends are sealed by plugs 35.

Figure 5:
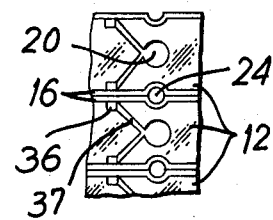
FIG. 5 is an enlarged view of the dialyzer taken in section along the line Y–Y of FIG. 2.

The inlet manifold 18 and outlet manifold 20 are connected to the distributing canals 36 through grooves 37 (FIG. 5); said grooves being inclined relative to the surfaces of plates 12.

Figure 2:
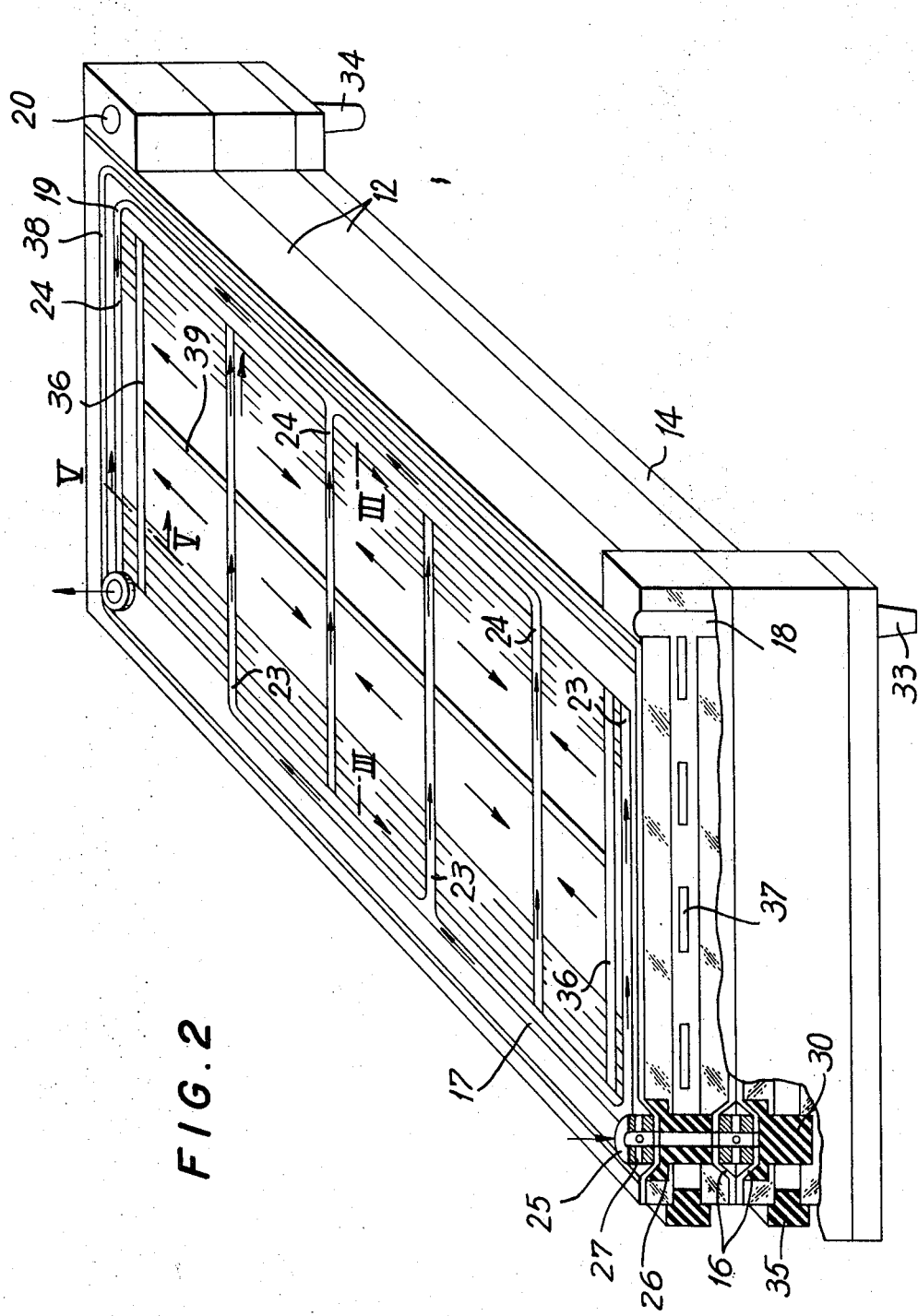
FIG. 2 is the dialyzer with its upper lid removed and one plate partly in section.

Placed along the perimeter of plates 12 are gaskets 38 (FIG. 2).

Through the center of plates 12 passes a bearing member 39 that stiffens said plates.

In FIGS. 1 and 2 the direction of blood flow in the dialyzer 1 is indicated by arrows.

The apparatus for the removal of toxic substances and excess water from blood operates in the following manner;

Under the force of the arteriovenous drop in blood pressure the blood of the patient flows via line 8 (FIG. 1), passing through the connecting branch 31 (FIG. 4), adapter 26 (FIG. 2), hole 28 in the semipermeable membrane 16, and the distributing sleeve 25, thence through openings 27 in the walls of the sleeve 25 it is delivered to the inlet manifold 17 (FIG. 2), from whence it passes through branches 23 into the capillary canals 22; the blood is then collected by branches 24 of the outlet manifold 19. Through a system of sleeves and adapters analogous to that in the inlet of the dialyzer I, and through the connecting branch 32 (FIG. 1) the blood returns along line 9 to the patient's organs.

The dialyzing solution flows from the container 3 via line 10 through connecting branch 33 to the inlet manifold 18 (FIG. 2) and then, via grooves 37, it enters the distributing canal 36, from whence it moves along grooves 21 (FIG. 3) to the distributing canal 36 (FIG. 2); further the dialyzing solution flows through grooves 37 (FIG. 5), the outlet manifold 20, connecting branch 34 (FIG. 1) and line 11, returning to the container 3. The dialyzing solution is driven by the vacuum pump 4.

Running along the capillary canals 22 (FIG. 3) the blood comes into contact with the dialyzing solution through the semipermeable membrane 16.

The mass exchange that takes place between the blood plasma and the dialyzing solution through the semipermeable membranes 16 results in the normalization of the blood plasma composition.

The present invention is embodied in an apparatus designed for removing toxic substances and excess water from blood upon direct connection (without a pump) of said apparatus to the body of the patient.

The priming volume of the apparatus, (the mains inclusive) is equal to 80 ml. which is smaller by a factor of 3 to 5 than the priming volume of the known apparatus.

The small priming volume makes feasible the use of the patient's blood for priming the apparatus, and therefore completely excludes use of the donor blood or blood substitutes, and also lowers the expenditures involved in hemodialysis.

All the elements of the blood-conveying system are sterilized by boiling in an autoclave preceding the assembly of the apparatus, while the assembly is conducted under aseptic conditions thereby reducing the time needed for preparing the apparatus for work.

The observed aforesaid sterilizing procedure obviates the necessity of 10- to 12-hour exposure to the effect of sterilizing agents resorted to for sterilizing the known apparatus.

All the above advantages of the present apparatus render it possible to simplify and make cheaper the method of hemodialysis, which method becomes available to the majority of patients, particularly in cases of chronic renal insufficiencies.

We claim:

1. An apparatus for removing toxic substances and excess water from blood, said apparatus comprising a dialyzer which includes plates and semipermeable membranes clamped between said plates; a network of grooves on the surfaces of said plates; capillary channels formed by said semipermeable membranes; inlet and outlet manifolds connecting said capillary channels, said inlet and outlet manifolds having branches disposed in alternating order within an operating layer enclosed by the semipermeable membranes; and means for moving a dialyzing solution in said dialyzer; said dialyzer further comprising distributing sleeves for directing the blood between said semipermeable membranes, and removable adapters arranged in holes provided in said plates and hermetically clamped between the said semipermeable membranes, said adapters connecting said inlet and outlet manifolds, mounted on opposite sides of said plates on the dialyzer.

2. An apparatus, according to claim 1 wherein the adapters are made of an elastic substance.

3. An apparatus according to claim 2, wherein the elastic substance is rubber.

4. An apparatus according to claim 1 wherein the inlet manifolds are tapered and the outlet manifolds are expanded in the direction of blood flow.